(12) United States Patent
Tanaya et al.

(10) Patent No.: US 6,234,146 B1
(45) Date of Patent: May 22, 2001

(54) KNOCK CONTROL DEVICE FOR AN INTERNAL COMBUSTION ENGINE

(75) Inventors: Kimihiko Tanaya; Yasuhiro Takahashi; Yasuyoshi Hatazawa; Mitsuru Koiwa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/495,487

(22) Filed: Feb. 1, 2000

(30) Foreign Application Priority Data

Sep. 20, 1999 (JP) .................................................. 11-265074

(51) Int. Cl.[7] ................................................... F02P 5/152
(52) U.S. Cl. ....................................................... 123/406.37
(58) Field of Search ........................ 123/406.29, 406.37, 123/406.38, 406.39

(56) References Cited

U.S. PATENT DOCUMENTS

| 5,694,900 | 12/1997 | Morita et al. | .................... | 123/425 |
| 5,836,285 | * 11/1998 | Aoki et al. | .................... | 123/406.37 |
| 5,979,406 | * 11/1999 | Aoki et al. | .................... | 123/406.37 |
| 6,145,491 | * 11/2000 | Wilstermann et al. | ......... | 123/406.37 |

* cited by examiner

Primary Examiner—Erick Solis
(74) Attorney, Agent, or Firm—Sughrue, Mion, Zinn, Macpeak & Seas, PLLC

(57) ABSTRACT

A knock control device for an internal combustion engine includes means 12 for calculating a knock level signal N on the basis of an ionic current, means 20 for arithmetically estimating a maximum noise level MN on the basis of a variation in the knock level signal, means 25 for obtaining a noise peak value PA on the basis of the maximum noise level, means 14A for calculating a background level BGLA on the basis of the noise peak value, means 15 for judging the knock on the basis of the background level, and means 7 for arithmetically operating the controlled variable on the basis of the knock judgement result.

18 Claims, 15 Drawing Sheets

KNOCK CONTROL DEVICE FOR AN INTERNAL COMBUSTION ENGINE

BACKGROUND OF THE INVENTION

1. Field of the Invention

The present invention relates to a device for detecting a knock of an internal combustion engine on the basis of an ionic current which flows in an ignition plug by combustion of fuel and for correcting the controlled variable of the internal combustion engine when the knock is detected. More particularly, the present invention relates to a knock control device for an internal combustion engine in which a relative reference value (background level) for knock judgement is calculated on the basis of an maximum noise level which is arithmetically estimated from a knock level signal to always optimize the background level, thereby preventing a misjudgment and a control error which are caused by the fluctuation of the noise level at unsteady time.

2. Description of the Related Art

Up to now, a knock control device for an internal combustion engine is designed in such a manner that it is judged whether a knock occurs during running, or not, and when it is detected that the knock occurs, the controlled variable of the internal combustion engine is corrected to a knock suppression side (for example, an ignition timing is corrected to a spark delay side) in response to the knock quantity in order to prevent the internal combustion engine from being damaged.

Also, in order to detect the knock of the internal combustion engine, there has been proposed a device using a change in the ion quantity which is caused by combustion of fuel.

The knock control device for the internal combustion engine using the ionic current is effective in realization of the reduced costs since the knock intensity can be detected for each of cylinders without using a knock sensor.

In the device of this type, in order to prevent the knock from being erroneously detected due to the superimposed noises of the ionic current, a noise judgement reference level (background level) is set with respect to an ionic current detection signal.

For example, in a device disclosed in Japanese Patent Unexamined Publication No. Hei 10-9108, a background level (judgment reference of the noise level) which is calculated from a sum of an average value of the detection signal intensity and an insensitive region (offset value) responsive to a running state is set with respect to a signal resulting from subjecting a knock current detection signal to a waveform shaping processing or the like.

FIG. 12 is a block diagram schematically showing a conventional knock control device for an internal combustion engine. Also, FIG. 13 is a timing chart showing the operating waveforms of the respective signals in FIG. 12, and shows a case in which a knock signal Ki is superimposed on a waveform shaping signal Fi of an ionic current detection signal Ei.

Referring to FIG. 12, an ignition unit 1 of an internal combustion engine (engine) includes an ignition coil having a primary winding and a secondary winding, and a power transistor that permits or interrupts the flow of a primary current i1 in the ignition coil (refer to FIG. 13), both of which are not shown.

The power transistor within the ignition unit 1 conducts the on/off control (permission/interruption of the flow) of the primary current i1 in the ignition coil in response to an ignition signal P from an ECU 5, and the ignition coil generates an ignition high voltage V2 from the secondary winding in response to the on/off operation of the power transistor (refer to FIG. 13).

An ignition plug 2 generates an ignition spark due to the ignition high voltage V2 which is applied to the ignition plug 2 from the ignition unit 1 and ignites an air-fuel mixture within each of cylinders of the engine at a given timing. In other words, the ignition high voltage is applied to the ignition plug 2 of each cylinder to be controlled in response to the ignition timing.

An ionic current detecting circuit 3 includes, in order to detect an ionic current that flows in a gap of the ignition plug 2 at the time of combustion, a bias means (capacitor) (not shown) for applying a bias voltage to the ignition plug 2 through the ignition coil within the ignition unit 1, and a resistor (not shown) that outputs an ionic current detection signal Ei.

A variety of sensors 4 include a known throttle opening sensor, a crank angle sensor, a temperature sensor and so on, and produce a variety of sensor signals indicative of the running state of the internal combustion engine. For example, the crank angle sensor among the various sensors 4 outputs a crank angle signal SGT in response to the r.p.m. of the engine (refer to FIG. 13).

The various sensor signals including the ionic current detection signal Ei and the crank angle signal SGT are inputted to the ECU 5 made up of a microcomputer. The crank angle signal SGT has a pulse edge representative of a crank angle reference position of each cylinder and are employed for various control operation within the ECU 5.

The ECU 5 includes a means for detecting a knock from a knock level signal (which will be described later) based on the ionic current detection signal Ei, and an ignition control means 7 for correcting the spark delay of the ignition signal P on the basis of a knock detection result from the knock detecting means.

The ignition control means 7 includes, in order to produce the ignition signal P on the basis of the running state from the various sensors 4 and a knock judgement result from a comparing means 15, an ignition timing operating means for deciding an ignition timing of the engine in response to the running state thereof and an ignition timing correcting means for arithmetically operating a spark delay quantity responsive to the knock detection quantity and allowing the spark delay quantity to be reflected on the ignition timing when the occurrence of knock is detected.

The controlled variable operating means for arithmetically operating the controlled variable of the engine is not limited to the ignition control means 7 but includes a fuel injection control means (not shown) for arithmetically operating a fuel injection amount and an injection timing, and so on. Also, the control variable correcting means for suppressing the knock can correct the spark delay of the fuel injection timing.

A knock detecting means is made up of a filtering means 11 formed of a band-pass filter, a counter means 12, an averaging means 13 within the ECU 5, an offset means 14 and a comparing means 15.

The filtering means 11, which includes a waveform shaping means, extracts a knock signal Ki having a given frequency band from a waveform shaping signal Fi (refer to FIG. 13) of the ionic current detection signal Ei. The counter means 12, which includes a waveform processing means, counts the number of pulses N of the knock signal Ki after waveform processing is performed.

The counter means 12 constitutes a knock level calculating means and calculates the number of pulses N (knock level signal) corresponding to the knock state of the engine on the basis of the knock signal Ki. The number of pulses N (knock level signal) represents the amount of knock occurrence.

The averaging means 13 averages the number of pulses N and calculates a knock level average value AVE. The offset means 14 offsets the knock level average value AVE and produces a background level BGL (noise level judgement reference).

The offset means 14 includes offset calculating means for calculating an offset value OFS with respect to the knock level average value AVE in response to the running state of the engine, and a background level calculating means for calculating the background level BGL by adding the knock level average value AVE and the offset value OFS.

The comparing means 15 constitutes a knock judging means and compares the number of pulses N (knock level signal) with the background level BGL to judge the knock state of the engine. The comparing means 15 outputs a comparison result indicative of a knock occurrence when the number of pulses N exceeds the background level BGL.

Subsequently, the operation of the conventional knock control device for the internal combustion engine will be described with reference to FIGS. 12 and 13 as well as the flowchart of FIG. 14.

First, the ECU 5 takes the crank angle signal SGT and so on from the various sensors 4 and conducts various arithmetic operations in response to the running state to output a drive signal to various actuators such as the ignition unit 1.

For example, the ECU 5 turns on/off the power transistor within the ignition unit 1 in response to the ignition signal P to permit or interrupt the flow of the primary current i1.

In this situation, a bias power supply (capacitor) within the ionic current detecting circuit 3 is charged with a primary voltage V1 generated at the ignition coil when the primary current i1 is permitted to flow.

Also, when the flow of the primary current i1 is interrupted (corresponding to the ignition timing of the engine), the primary voltage V1 goes up so that a secondary voltage V2 (several tens kV) boosted more is generated from the secondary winding of the ignition coil. The secondary voltage V2 is applied to the ignition plug 2 of an ignition control cylinder, to thereby burn a fuel-air mixture within a combustion chamber.

With the above combustion of the fuel-air mixture, since ions occur within the combustion chamber of each the combustion cylinder, the bias voltage charged in the capacitor within the ionic current detecting circuit 3 is discharged through the ignition plug 2 which has been just now ignition-controlled.

The resistor within the ionic current detecting circuit 3 converts the ionic current into a voltage and outputs the voltage as an ionic current detection signal Ei.

The ionic current that flows through the ignition plug 2 after combustion is inputted to the filtering means 11 as the ionic current detection signal Ei.

In this situation, if a knock occurs in the engine, since a knock vibration component is superimposed on the ionic current, the waveform shaping signal Fi of the ionic current detection signal Ei has a waveform on which the knock vibration component is superimposed as shown in FIG. 13.

The operation of processing the ionic current detection signal Ei is shown in FIG. 14. Referring to FIG. 14, the filtering means 11 first extracts only the knock signal Ki from the waveform shaping signal Fi of the ionic current detection signal Ei (step S1).

The counter means 12 shapes the waveform of the knock signal Ki and converts it into a knock pulse train Kp, and thereafter counts the number of pulses N of the knock pulse train Kp (step S2).

The number of pulses N greatly pertains to the intensity of knock and, as will be described later, is used for the knock judgement and also used for update operation of a succeeding background level BGL.

In other words, the comparing means 15 within the ECU 5 compares the number of pulses N with the background level BGL which has been previously calculated and judges whether the number of pulses N is larger than the background level BGL, or not (step S3).

Since the number of pulses N becomes larger as the intensity of knock becomes large, the comparing means 15 can judge the presence/absence of a knock and the intensity of the knock on the basis of the number of pulses N.

The ignition control means 7 calculates a spark delay controlled variable for making a spark delay of the ignition timing (suppression of the knock) (step S4) if N>BGL (that is, YES) is judged in the step S3. On the contrary, the ignition control means 7 calculates the spark advance controlled variable for making a spark advance of the ignition timing (step S5) if N BGL (that is, NO) is judged in the step S3.

In this situation, the ignition control means 7 refers to the spark delay correction amount at the time of the previous and present ignition control in the step S4 and refers to the spark advance correction amount at the time of the previous ignition control in the step S5, to thereby calculate the respective controlled variables.

Also, if a state of N>BGL (knock occurrence) is continuously judged in the step S3, the spark delay amount is sequentially integrated, and the integration of the spark delay is stopped at the time when the knock occurrence is not judged.

The background level BGL (a given number of pulses) which is a relative reference for knock judgement is set to, for example, a value of about 5 to 20 although it depends on the r.p.m. of the engine, the waveform shaping level of the detection signal Ei or the like.

In this way, if the knock occurrence is detected on the basis of the number of pulses N by the comparing means 15, the controlled variable is corrected to the knock suppression side (that is, the ignition timing to a knock occurring cylinder is optimized), thereby being capable of effectively suppressing the knock.

On the other hand, the averaging means 13 within the ECU 5 averages the number of pulses N (filter processing) and calculates the knock level average value AVE using the following expressions (1) and (2) (step S6).

$$AVE = AVE(n-1) \times KF + NP \times (1-KF) \tag{1}$$

$$NP = \max\{N - BGL(n-1), 0\} \tag{2}$$

In the expression (1), AVE(n−1) is a previous value of the knock level average value AVE, and KF is an averaging coefficient (0<KF<1). Also, in the expression (2), BGL(n−1) is a previous value of the background level BGL.

Also, the offset means 14 adds the offset value OFS to the knock level average value AVE and calculates the background level BGL as represented by the following expression (3) (step S7).

$$BGL = AVE + OFS \quad (3)$$

Finally, the ECU 5 stores the background level BGL which has been calculated through the expression (3) in the offset means 14 as the relative reference for knock judgement at the time of the succeeding ignition control (step S8), thus completing a processing routine shown in FIG. 14.

Subsequently, the knock detecting operation when the knock level average value AVE becomes an improper value in an unsteady state will be described with reference to the explanatory diagrams of FIGS. 15 to 17.

In FIGS. 15 to 17, an axis of abscissa is a time, and there is shown a case in which a running state is shifted from a knock non-occurrence region (steady region) to a knock occurrence region (for example, a transition region) and again returned to the knock non-occurrence region.

Also, in FIGS. 15 to 17, an axis of ordinate (the respective levels indicated by bar graphs) is the number of pulses N which includes the number of pulses Pn corresponding to the noise level and the number of pulses Pk corresponding to the knock occurrence level.

FIG. 15 shows a change in the knock level average value AVE with time and a steady noise component Cn with respect to the number of pulses N (N=about 1 to 2), FIG. 16 shows a change in the background level BGL with time and a steady noise component Cn with respect to the number of pulses N, and FIG. 17 shows a change in the background level BGL with time with respect to the number of pulses N in the case where a variation exists between the respective cylinders.

Referring to FIG. 15, since the steady noise component Cn is relatively stably changed at a low level and always equal to or less than the knock level average value AVE, there is no case in which the stead noise component Cn is misjudged as the knock.

However, since the number of pulses Pn of the unsteady noise component (relatively high level) exceeds the knock level average value AVE, it is misjudged as the number of pulses Pk having the knock occurrence level.

In particular, in the knock occurrence region, the number of pulses Pn of the unsteady noise component is liable to be detected, which causes the knock misjudgment, thereby being liable to mis-control the controlled variable such as the spark delay correction of the ignition timing.

On the other hand, as shown in FIG. 16, if the offset value is added to the number of pulses N to set the background level BGL high in level, it is suppressed to misjudge the number of pulses Pn of the noise level as a knock state.

However, in the case where a variation exists between the respective cylinders, as shown in FIG. 17, in a cylinder small in the detected amount of the number of pulses N, the number of pulses Pk having the knock occurrence level becomes equal to or less than the background level BGL, thereby causing the number of pulses Pk to be misjudged as the number of pulses Pn having the noise level.

As a result, even in the knock occurrence state where the ignition timing should be spark-delay corrected, the frequency of knock occurrences increases without executing the correction of the controlled variable, resulting in a fear that the engine is damaged.

As described above, in the conventional knock control device for the internal combustion engine, since the background level BGL is not shifted to a proper value depending on the occurrence state of the number of pulses N (knock level signal), there arises such a problem that the number of pulses Pn of the unsteady noise component is misjudged as the knock state as shown in FIG. 15, or the number of pulses Pk having the knock occurrence level is misjudged as the noise state as shown in FIG. 17, to thereby deteriorate the knock controllability.

SUMMARY OF THE INVENTION

The present invention has been made to solve the above problems, and therefore an object of the present invention is to provide a knock control device for an internal combustion engine in which a background level is calculated on the basis of a maximum noise level which is arithmetically estimated according to a knock level signal to always hold the background level at an optimum value without depending on the occurrence state of a knock level signal so that the knock level signal is prevented from being mis-detected as the noise, etc., to thereby improve the reliability.

In order to achieve the above object, according to the present invention, there is provided a knock control device for an internal combustion engine, comprising various sensors for detecting the running state of the internal combustion engine; ionic current detecting means for detecting an ionic current that flows through an ignition plug by combustion of fuel; knock level calculating means for calculating a knock level signal corresponding to a knock state of the internal combustion engine on the basis of the ionic current; background level calculating means for calculating a background level on the basis of the knock level signal; knock judging means for judging the knock state of the internal combustion engine by comparing the knock level signal with the background level; and controlled variable operating means for arithmetically operating the controlled variable of the internal combustion engine on the basis of the running state of the internal combustion engine and a judgement result of the knock judging means; wherein the background level calculating means includes maximum noise level estimating means for arithmetically estimating a maximum noise level on the basis of a variation in the knock level signal, and peak hold means for obtaining a noise peak value on the basis of the maximum noise level, and the background level is calculated on the basis of the noise peak value.

Also, according to the present invention, there is provided the knock control device for an internal combustion engine, wherein the peak hold means includes lower limit value calculating means for calculating a lower limit value of the maximum noise level as a relative reference, and the peak hold means updates the maximum noise level as the noise peak value if the maximum noise level exceeds the lower limit value, holds the noise peak value over a given period if the maximum noise level is equal to or less than the lower limit value, and subtracts only a given value from the noise peak value and updates the noise peak value until the maximum noise level reaches the lower limit value if a state in which the maximum noise level is equal to or less than the lower limit value continues for the given period or longer.

Further, according to the present invention, there is provided the knock control device for an internal combustion engine, wherein the lower limit value calculating means includes hysteresis converting means, calculates the maximum noise level average value by averaging the maximum noise level and outputs a value resulting from converting the maximum noise level average value into hysteresis as the lower limit value.

Still further, according to the present invention, there is provided the knock control device for an internal combustion engine, wherein the maximum noise level estimating means includes data shift means for storing a given number of newest knock level signals therein, first operating means for calculating a first state value corresponding to a data variation of the knock level signals using the given number of knock level signals, and second operating means for arithmetically estimating the maximum noise level on the basis of the first state value.

Yet still further, according to the present invention, there is provided the knock control device for an internal combustion engine, wherein the data shift means includes arithmetically substituting means for substituting a value equal to or less than the noise peak value for the knock level signal that exceeds the background level and storing the substituted value therein.

Yet still further, according to the present invention, there is provided the knock control device for an internal combustion engine, wherein the first operating means approximately operates a sample standard deviation of the given number of knock level signals as the first state value.

Yet still further, according to the present invention, there is provided the knock control device for an internal combustion engine, wherein the first operating means approximately operates a sample standard deviation by using an addition value of the maximum value and the minimum value of the given number of knock level signals.

Yet still further, according to the present invention, there is provided the knock control device for an internal combustion engine, wherein the second operating means calculates the second state value corresponding to a level of the knock level signal and arithmetically estimates the maximum noise level by using an addition value of the first state value and the second state value.

Yet still further, according to the present invention, there is provided the knock control device for an internal combustion engine, wherein the maximum noise level estimating means includes averaging means for averaging the knock level signal to calculate the knock level average value, and the second operating means calculates the second state value by using the knock level average value.

Yet still further, according to the present invention, there is provided the knock control device for an internal combustion engine, wherein the background level calculating means includes offset calculating means for calculating the offset value on the basis of a variation in the knock level signal and offset means for calculating the background level by adding the noise peak value and the offset value, and the offset calculating means sets the offset value to an increased value in response to an increase of the first state value.

Yet still further, according to the present invention, there is provided the knock control device for an internal combustion engine, wherein the knock judging means judges that the internal combustion engine is in a knock state if the knock level signal exceeds the background level, judges that the knock level signal represents a noise if the knock level signal is equal to or less than the noise peak value, and uses a previous judgement result as a present judgement result if the knock level signal exceeds the noise peak value and is equal to or less than the background level.

Yet still further, according to the present invention, there is provided the knock control device for an internal combustion engine, wherein the knock judging means judges that the knock level signal represents a noise if a state where the knock level signal exceeds the noise peak value and is equal to or less than the background level continues over a given period.

Yet still further, according to the present invention, there is provided the knock control device for an internal combustion engine, wherein the background level calculating means includes peak value averaging means for averaging the noise peak value to calculate the noise peak average value, and calculates the background level on the basis of the noise peak average value, and the peak value averaging means includes hysteresis converting means and calculates the noise peak average value as a hysteresis value.

Yet still further, according to the present invention, there is provided the knock control device for an internal combustion engine, wherein the hysteresis converting means adds a given correction value to the noise peak average value if the noise peak average value tends to go up, and subtracts only one level from the noise peak average value at the time when the noise peak average value goes down to a lower value by only two levels if the noise peak average value tends to go down, to thereby calculate the noise peak average value as a hysteresis value.

Yet still further, according to the present invention, there is provided the knock control device for an internal combustion engine, wherein the background level calculating means includes map data for storing a correction coefficient corresponding to a rapid change in the engine revolution and a load, and variously sets the background level on the basis of the map data over the given period if the engine revolution or the load is rapidly changed.

Yet still further, according to the present invention, there is provided the knock control device for an internal combustion engine, wherein the controlled variable operating means arithmetically operates the controlled variable of the internal combustion engine on the basis of a comparison value representative of a ratio or a deviation of the knock level signal and the background level.

Yet still further, according to the present invention, there is provided the knock control device for an internal combustion engine, wherein the controlled variable operating means arithmetically operates, if the ratio of the knock level signal and the background level is equal to or more than a given value, the controlled variable by using the ratio, and arithmetically operates the controlled variable by using the level deviation of the knock level signal and the background level if the ratio is smaller than the given value.

Yet still further, according to the present invention, there is provided the knock control device for an internal combustion engine, wherein the controlled variable operating means includes averaging means for averaging the knock level signal to calculate the knock level average value, comparing means for comparing the knock level average value with a given level, and subtracting means for calculating a level deviation of the knock level signal and the knock level average value, and arithmetically operates the controlled variable of the internal combustion engine on the basis of an absolute value of the knock level signal if the knock level average value is equal to or less than the given level and arithmetically operates the controlled variable of the internal combustion engine on the basis of the level deviation if the knock level average value exceeds the given level.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENTS

Now, a description will be given in more detail of preferred embodiments of the present invention with reference to the accompanying drawings.
(First Embodiment)

Hereinafter, a first embodiment of the present invention will be described with reference to the accompanying drawings.

Figure 1:
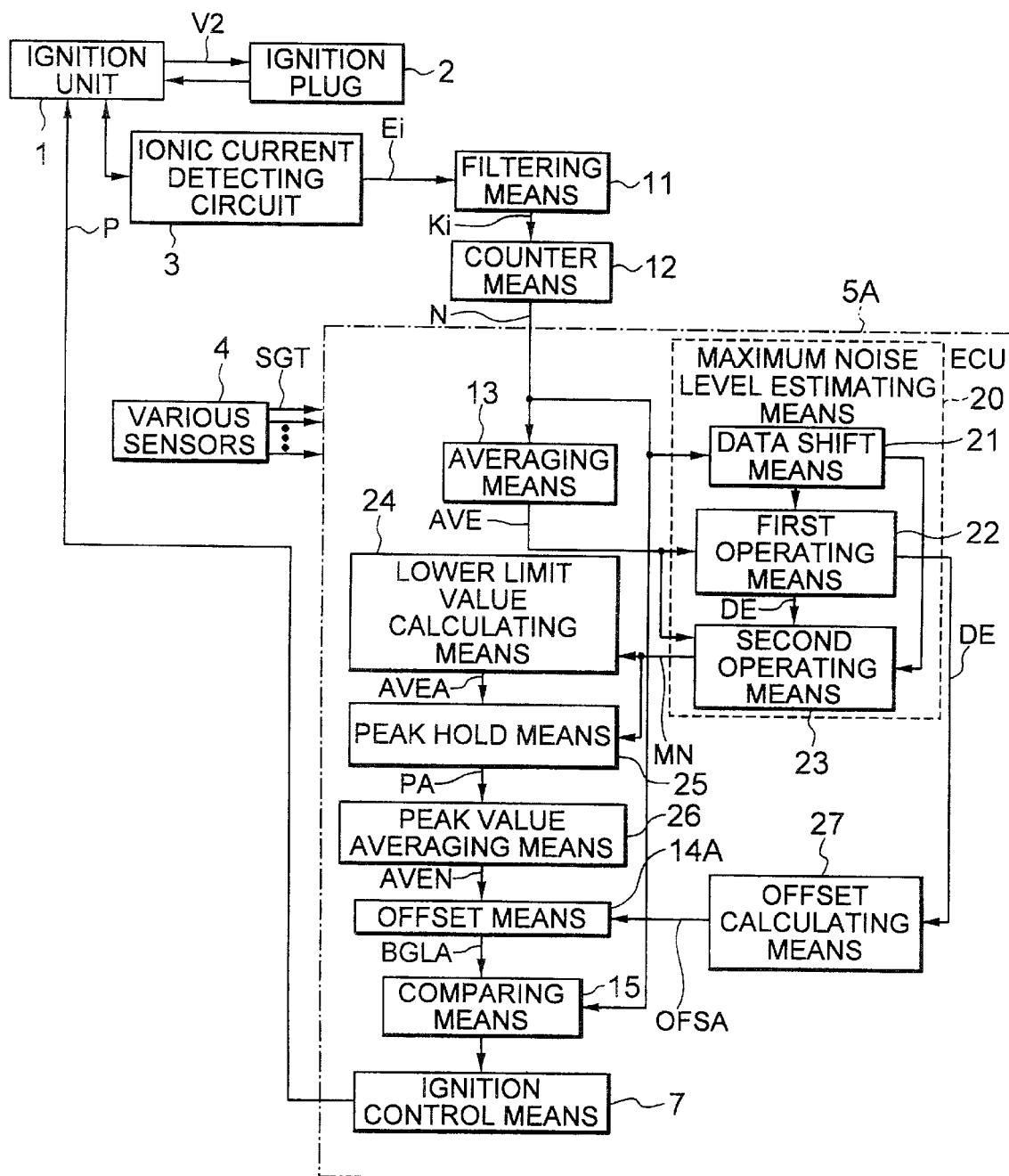
FIG. 1 is a block diagram showing a first embodiment of the present invention.

FIG. 1 is a block diagram schematically showing the first embodiment of the present invention, and the same parts as those described above are designated by identical references, and their detailed description will be omitted.

Referring to FIG. 1, knock detecting means includes, in addition to the above-described filtering means 11 to comparing means 15, a maximum noise level estimating means 20, a lower limit value calculating means 24, a peak hold means 25, a peak value averaging means 26 and an offset calculating means 27 within an ECU 5A.

The maximum noise level estimating means 20, the lower limit value calculating means 24, the peak hold means 25, the peak value averaging means 26 and the offset calculating means 27 constitute a background level calculating means in association with an offset means 14A. The lower limit value calculating means 24 may be included in the peak hold means 25.

The maximum noise level estimating means 20 includes a data shift means 21, a first operating means 22 and a second operating means 23 in order to arithmetically estimate a maximum noise level MN on the basis of a variation in the number of pulses N (a first state value which will be described later).

The data shift means 21 stores the number of pulses N for a given number of data obtained over a given ignition cycle (given period) of an engine.

Also, the data shift means 21 includes an arithmetically substituting means for substituting a value which is equal to or less than a noise peak value PA or a noise peak average value AVEN (which will be described later) for the number of pulses N which exceeds a background level BGLA and storing the substituted value therein, and inhibits the data storage of an excessive number of pulses N.

The first operating means 22 arithmetically operates a first state value DE corresponding to a data variation in the number of pulses N by using a knock level average value AVE from an averaging means 13 and the number of pulses N (plural data) within the data shift means 21.

Also, the second operating means 23 arithmetically estimates the maximum noise level MN by using the knock level average value AVE, the number of pulses N within the data shift means 21 and the first state value DE.

The lower limit value calculating means 24 averages the maximum noise level MN to calculate a lower limit value AVEA consisting of the maximum noise level average value. Incidentally, the lower limit value calculating means 24 includes a hysteresis integer converting means and produces the lower limit value AVEA as a hysteresis integer value.

In this example, because the knock level signal is of the number of pulses N (integer value), the hysteresis integer converting means is used as the hysteresis converting means.

The peak hold means 25 obtains the noise peak value PA on the basis of the maximum noise level MN which is equal to or more than the lower limit value AVEA. That is, the peak hold means 25 outputs the maximum noise level MN which is equal to or greater than the lower limit value AVEA as the noise peak value PA.

Also, the peak hold means 25 updates the maximum noise level MN as the present noise peak value PA if the maximum noise level MN exceeds the lower limit value AVEA.

Further, the peak hold means 25 holds the noise peak value PA over the given ignition cycle of the engine if a state in which the maximum noise level MN is equal to or less than the lower limit value AVEA continues.

Still further, the peak hold means 25 updates the noise peak value PA to a value resulting from subtracting only a given value from the noise peak value PA if a state in which the maximum noise level MN is equal to or less than the lower limit value AVEA continues over the given ignition cycle or longer.

With the above structure, the peak hold means 25 prevents the noise peak value PA from being over-held over a longer period than need be.

Also, the peak hold means 25 sets the minimum value of the noise peak value PA to the lower limit value AVEA to prevent the noise peak value PA from being over-subtracted.

Incidentally, in this example, the maximum noise level average value is used as the lower limit value AVEA of the noise peak value PA. Alternatively, the knock level average value AVE from the averaging means 13 may be used, to thereby make it possible to simplify the processing of setting the lower limit value.

The peak value averaging means 26 averages the noise peak value PA to calculate the noise peak average value AVEN.

Also, the peak value averaging means 26 includes hysteresis integer converting means and produces the noise peak average value AVEN as a hysteresis integer value.

The offset calculating means 27 calculates the offset value OFSA so that the offset value OFSA increases in response to an increase in the first state value DE with reference to the first state value DE.

The offset means 14A adds the noise peak average value AVEN and the offset value OFSA together to calculate a final background level BGLA.

Also, the offset means 14A grasps the r.p.m. of the engine and the load parameter (for example, a throttle opening degree, a suction pressure or the like) contained in the information detected by the various sensors 4, and variably sets the background level BGLA in response to a rapid change in the r.p.m. and the load of the engine.

In other words, the offset means 14A includes two-dimensional map data for storing correction coefficient corresponding to the rapid change in the r.p.m. of the engine and the load therein, and variably sets the background level BGLA on the basis of the map data when the r.p.m. of the engine or the load is rapidly changed.

For example, if a rapid increase in the r.p.m. of the engine or a rapid decrease in the load is detected, in order to cope with the rapid increase in the noise level which is difficult to conduct follow-up operation, the correction coefficient of "1" or more is multiplied by the background level BGLA to correct the background level BGLA to a larger side over the given ignition cycle (given period) of the engine.

The comparing means 15 compares the background level BGLA with the number of pulses N to judge whether the knock occurs or not, and the ignition control means 7 produces an ignition signal P on the basis of the comparison result of the comparing means 15 and the running state.

Incidentally, in this example, the offset means 14A calculates the background level BGLA by using the noise peak average value AVEN, but may calculate it by using the noise peak value PA.

Also, in this example, the offset value OFSA is added to the noise peak average value AVEN to calculate the background level GBLA. Alternatively, the noise peak average value AVEN or the noise peak value PA may be used for the background level BGLA as it is.

Subsequently, the operation of the first embodiment shown in FIG. 1 according to the present invention will be described with reference to a flowchart shown in FIG. 2 and explanatory diagrams shown in FIGS. 3 to 7.

FIGS. 3 to 7 show a variation in the number of pulses N (knock level signal), the maximum noise level MN, the noise peak value PA, the noise peak average value AVEN and the background level BGLA with time, respectively.

Figure 2:
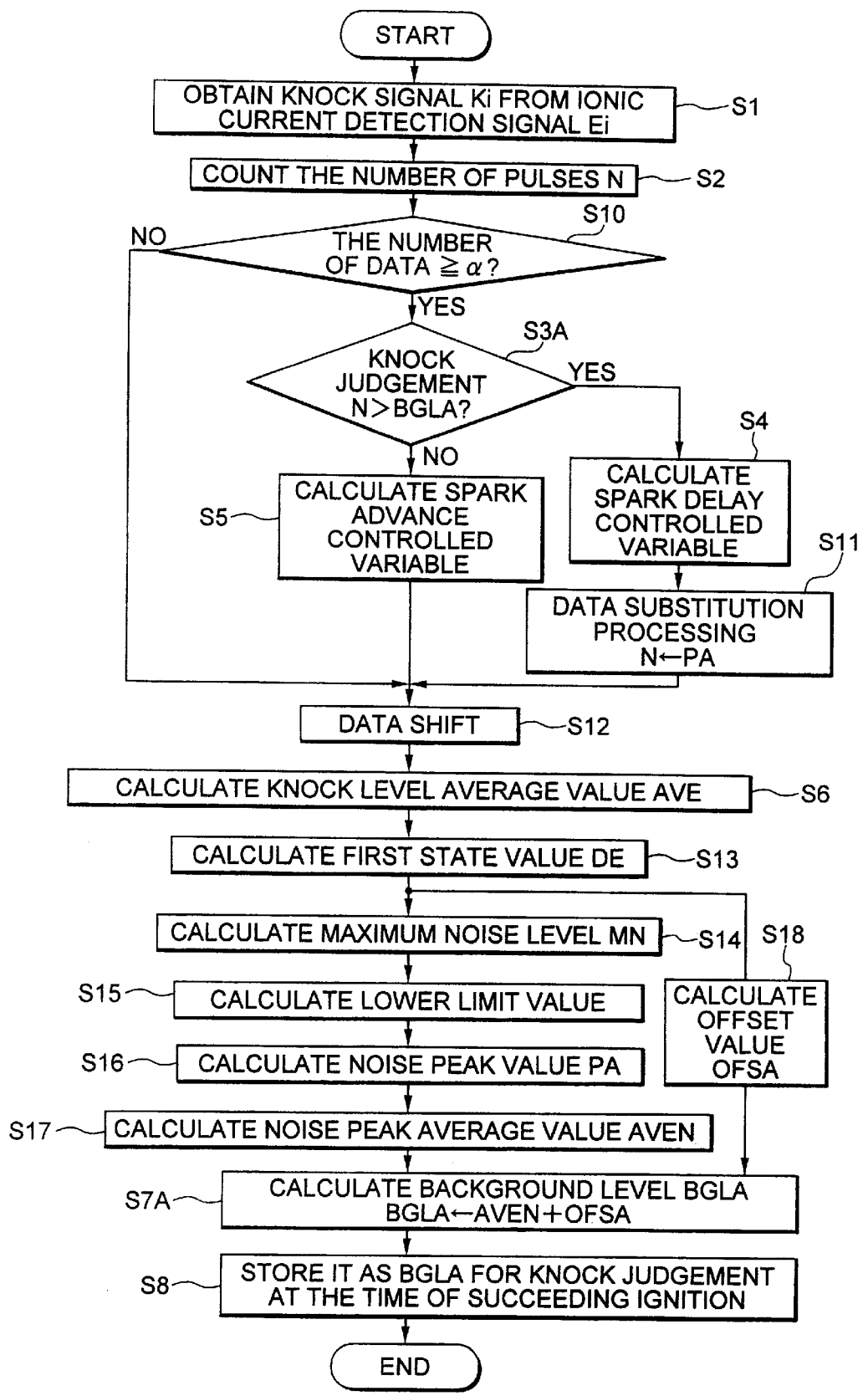
FIG. 2 is a flowchart showing background level calculating operation in accordance with the first embodiment of the present invention.
Figure 14:
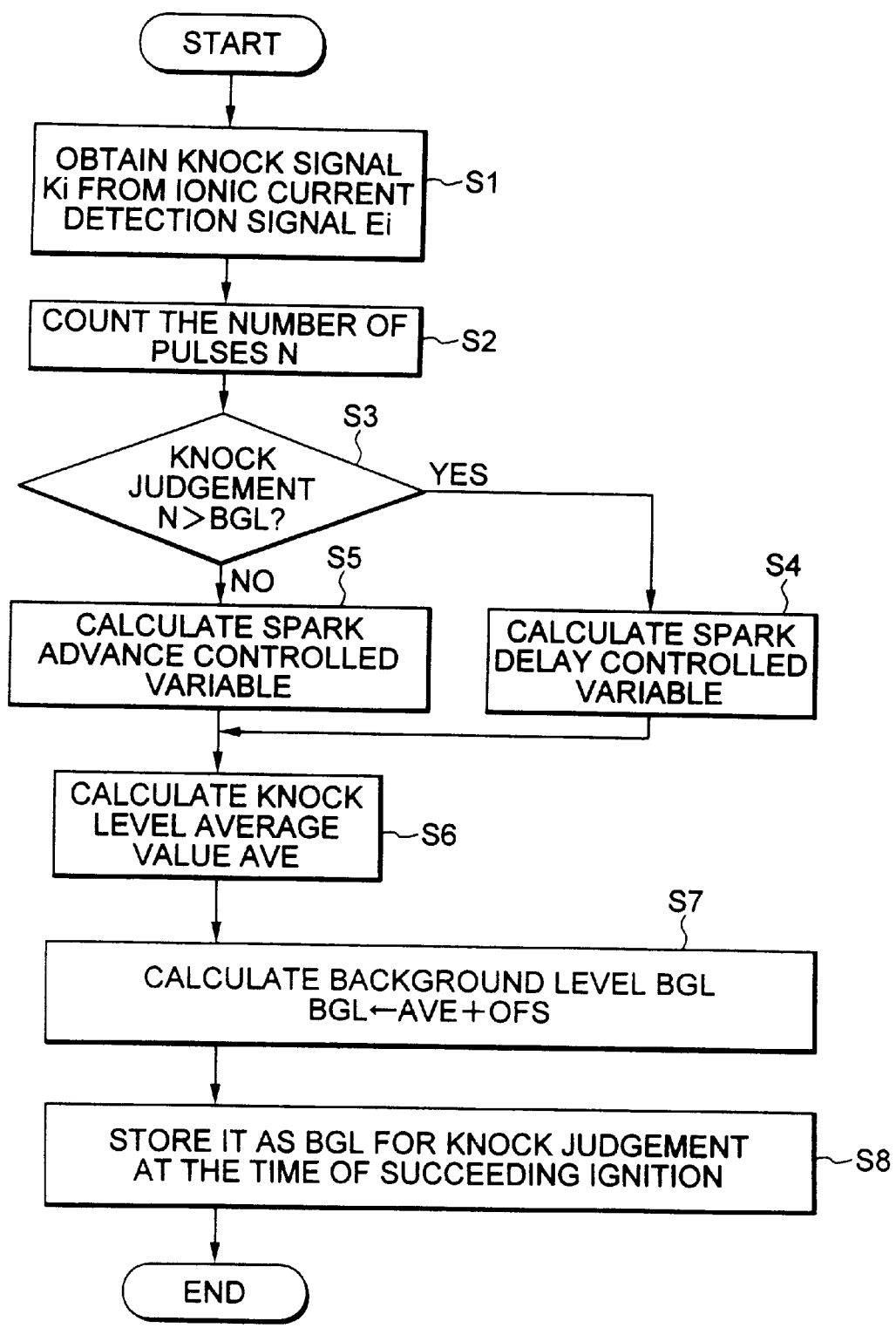
FIG. 14 is a flowchart showing background level calculating operation in the conventional knock control device for an internal combustion engine.
Figure 15:
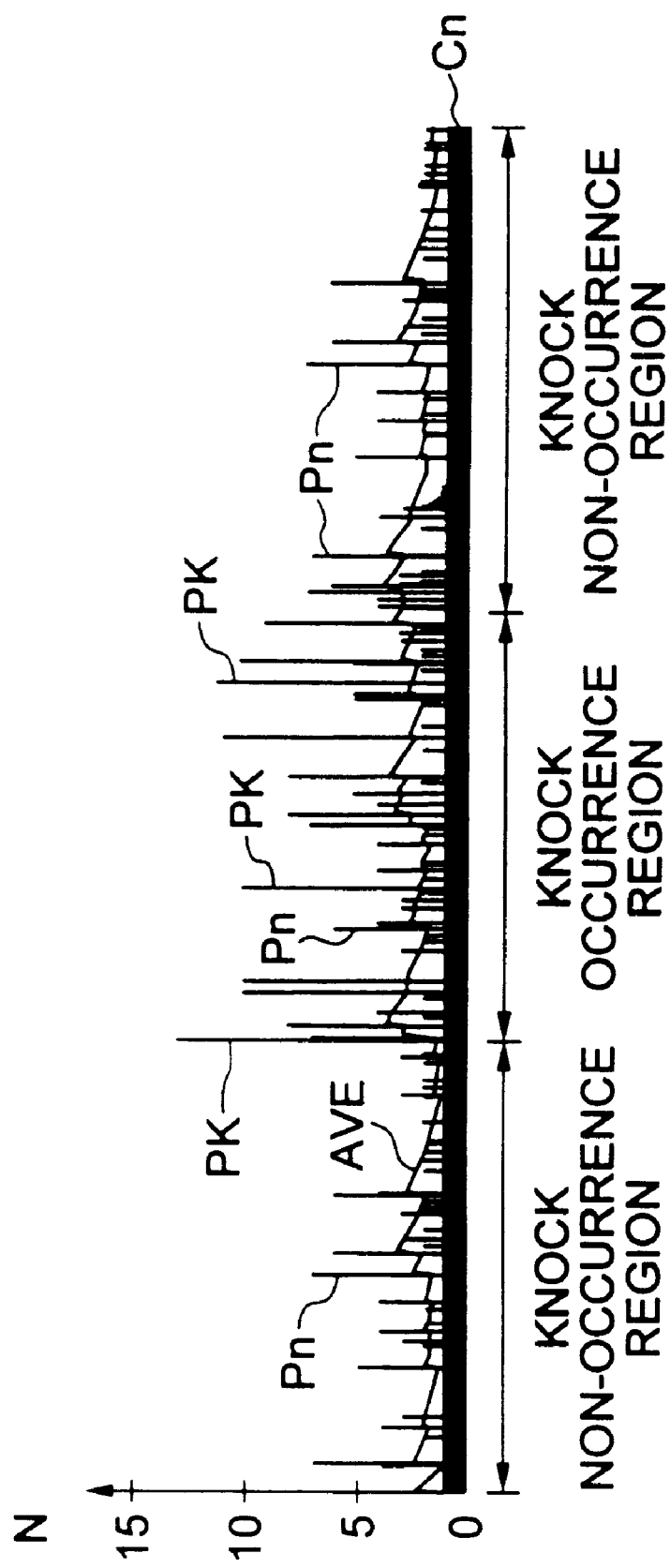
FIG. 15 is an explanatory diagram showing the knock detecting operation in the conventional knock control device for an internal combustion engine.

Referring to FIG. 2, the same steps S1 to S8 as those described above (refer to FIG. 14) are designated by identical references and their detailed description will be omitted. It is noted that the steps S3A and S7A correspond to the above-described steps S3 and S7, respectively.

First, the knock detecting means within the ECU 5A obtains running information including the r.p.m. of the engine and the load parameter (throttle opening degree, etc.) as well as the ionic current detection signal Ei (step S1), and the counter means 12 within the knock detecting means counts the number of pulses N (step S2).

Subsequently, the data shift means 21 within the maximum noise level estimating means 20 judges whether the number of data obtained from the number of pulses N reaches a given number, or not (step S10).

The given number is set to the minimum number of data which is required for operating such as the lower limit value AVEA and the first state value DE.

In the step S10, if it is judged that the number of data is equal to or more than the given number (that is, YES), the knock judging processing (step S3A) and the knock control processing (steps S4 and S5) are executed as in the above manner.

In this situation, if N>BGLA (that is, YES) is judged in the step S3A and the spark delay control processing for knock suppression is executed (step S4), the noise peak value PA (or, the noise peak average value AVEN) is substituted for the present data (the number of pulses N), and the present data is set to a value equal to or less than the noise peak value PA (step S11).

As a result, the number of pulses N having the excessive level is not stored in the data shift means 21, and the number of pulses N having the excessive level is not used for arithmetic estimation of a succeeding maximum noise level MN. Accordingly, the reliability of the maximum noise level Mn is not lowered.

Subsequently, the data shift is executed to update the data within the data shift means 21 to the newest data of the given number (step S12). That is, the oldest data among the past data is deleted, and the present data is additionally stored.

On the other hand, in the step S10, if it is judged that the number of data is less than the given number (that is, NO), the operation is immediately advanced to the step S12 without execution of the knock judgement and the control processing (steps S3A to S5).

Then, the averaging means 13 calculates the knock level averaging value AVE from the number of pulses N (step S6). Also, the first operating means 22 within the maximum noise level estimating means 20 calculates the first state value DE from the following expression (4) by using the data stored in the data shift means 21 (step S13).

$$DE = k1 \times MAX + k2 \times MIN \tag{4}$$

In the expression (4), MAX and MIN are the maximum and minimum among the number of pulses N of the given number obtained within the given ignition cycle, respectively, and k1 and k2 are given coefficients for multiplication correction, respectively.

Figure 3:
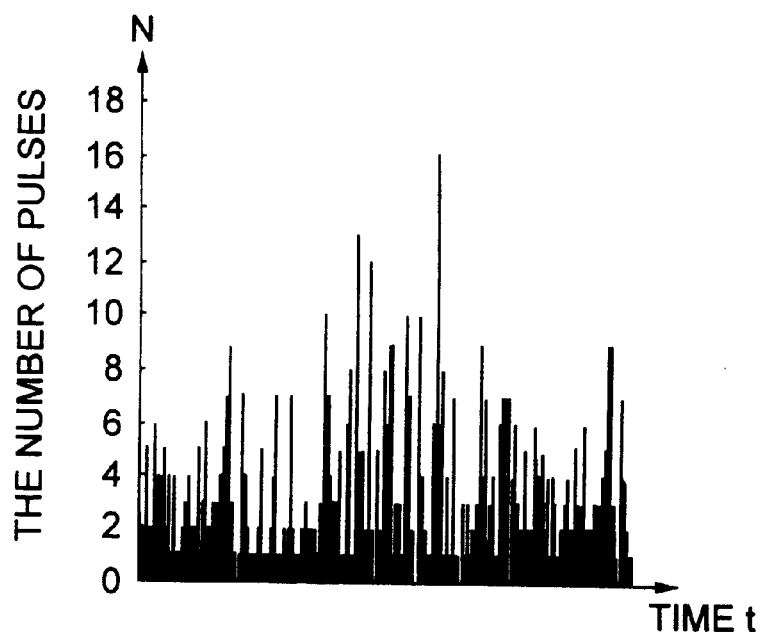
FIG. 3 is an explanatory diagram showing a change in the number of pulses N detected in the first embodiment of the present invention with time.
Figure 4:
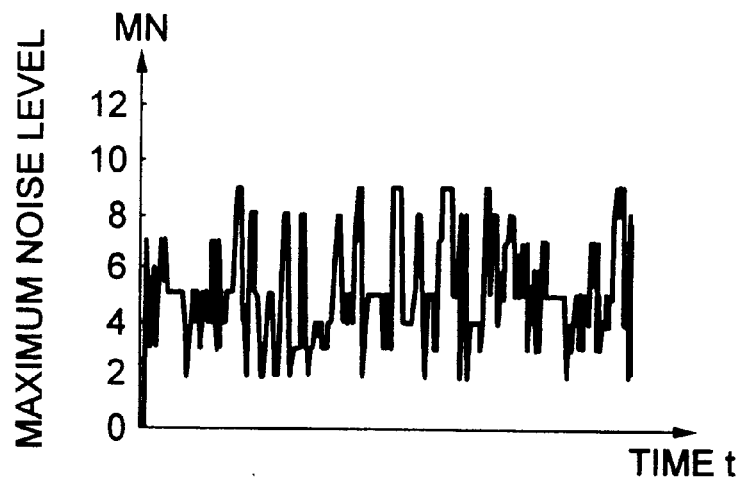
FIG. 4 is an explanatory diagram showing a change in a maximum noise level MN arithmetically estimated in accordance with the first embodiment of the present invention with time.
Figure 5:
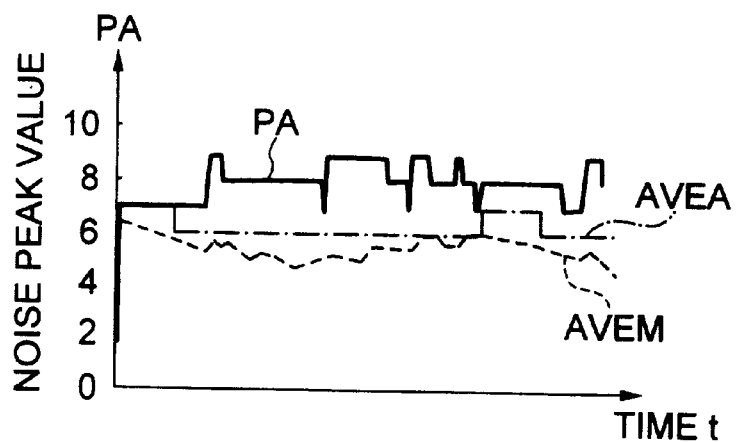
FIG. 5 is an explanatory diagram showing a change in a noise peak value PA calculated in accordance with the first embodiment of the present invention with time.
Figure 6:
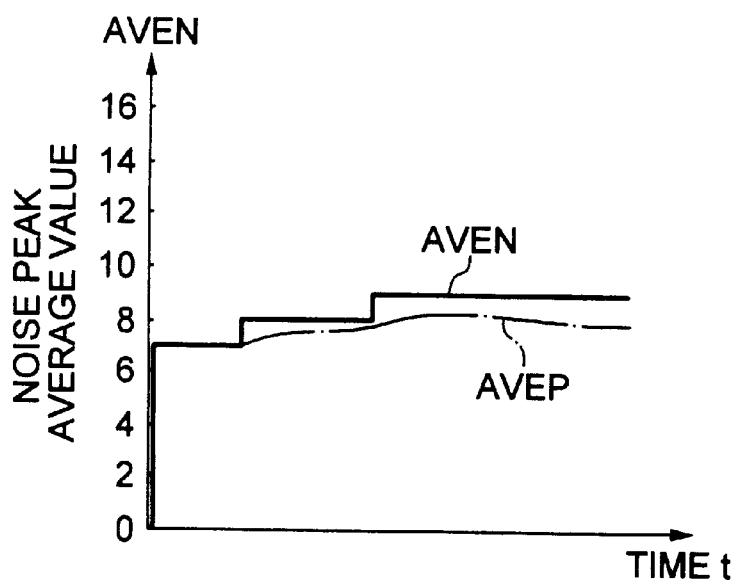
FIG. 6 is an explanatory diagram showing a change in a noise peak average value AVEN calculated in accordance with the first embodiment of the present invention with time.

The first state value DE calculated from the expression (4) is a value resulting from approximating a value of a sample standard deviation corresponding to a variation in the data value of the number of pulses N (refer to FIG. 3).

The approximate value of the sample standard deviation can also be calculated from the following expression (5) by using the knock level average value AVE from the averaging means 13.

$$DE = k3 \times MAX + k4 \times AVE \tag{5}$$

In the expression (5), k3 and k4 are given coefficients for multiplication correction, respectively.

Since the sample standard deviation is approximately operated by using the expression (4) or (5), the operating load with the maximum noise level estimating means 20 can be reduced.

In particular, in the case where the sample standard deviation is approximately operated by using the maximum MAX and the minimum MIN of the number of pulses N as represented by the expression (4), not only the operating load is reduced but also the operating accuracy is not greatly lowered.

Then, the second operating means 23 within the maximum noise level estimating means 20 arithmetically estimates the maximum noise level MN (refer to FIG. 4) from the following expression (6) by using the first state value DE and the knock level average value AVE (step S14).

$$MN = k5 \times DE + k6 \times AVE \qquad (6)$$

In the expression (6), k5 and k6 are given coefficients for multiplication correction, and k6×AVE corresponds to the second state value corresponding to the level of the number of pulses N.

The maximum noise level MN high in reliability can be calculated by using the first and second state values (DE, AVE) corresponding to a variation and a level of the data of the number of pulses N as represented by the expression (6).

It is noted that, in the expression (6), the knock level average value AVE is used as the second state value. Alternatively, the maximum MAX of the number of pulses N within the given ignition cycle may be used. In this case, the maximum noise level MN is arithmetically estimated from the following expression (7).

$$MN = k7 \times DE + k8 \times MAX \qquad (7)$$

In the expression (7), k7 and k8 are given coefficients for multiplication correction, and k8×MAX corresponds to the second state value.

Subsequently, the lower limit value calculating means 24 calculates the lower limit value AVEM (refer to a broken line in FIG. 5) which suppresses the fluctuation component of the maximum noise level MN and also provides the lower limit value AVEM with a hysteresis integer to calculate a final lower limit value AVEA (refer to an alternate long and short dash line in FIG. 5) (step S15).

In other words, the lower limit value calculating means 24 first adds the maximum noise level MN that suppresses the reflectance to the previous lower limit value AVEM (n−1) and then updates the present lower limit value AVEM as represented by the following expression (8).

$$AVEM = Kf \times AVEM(n-1) + (1-Kf) \times MN \qquad (8)$$

In the expression (8), kf is a filter coefficient for variation suppression and set to a range of 0<Kf<1 as is well known.

The lower limit value AVEM which has been averaged through the expression (8) is further suppressed in variation by hysteresis integer conversion so as to be stabilized and outputted as a final lower limit value AVEA.

Subsequently, the peak hold means 25 compares the lower limit value AVEA with the maximum noise level MN, and if the maximum noise level MN satisfies MN>AVEA, the peak hold means 25 updates the maximum noise level MN as the noise peak value PA (refer to FIG. 5) and output it (step S16).

Also, the peak hold means 25 continuously holds the noise peak value PA over the given ignition cycle if the maximum noise level MN is equal to or less than the lower limit value AVEA.

However, if a state of MN AVEA continues over the given ignition cycle or longer, the peak hold means 25 reduces the noise peak value PA by a given value to prevent over-holding, and also ensures the noise peak value PA to be equal to or more than the lower limit value AVEA to prevent over-reduction.

Also, the peak value averaging means 26 averages the noise peak value PA to calculate the noise peak average value AVEP (refer to an alternate long and short dash line in FIG. 6) and converts it into a hysteresis integer that is outputted as a final noise peak average value AVEN (step S17).

In this way, the noise peak average value AVEN high in stability and reliability is obtained on the basis of the maximum noise level MN that reflects the data variation state and the level state of the number of pulses N.

On the other hand, the offset calculating means 27 calculates the offset value OFSA in accordance with the first state value DE representative of the noise level fluctuation (step S18).

Also, the offset means 14A adds the noise peak average value AVEN and the offset value OFSA together to calculate the background level BGLA (refer to FIG. 7) through the following expression (9) (step S7A).

$$BGLA = AVEN + OFSA \qquad (9)$$

In the expression (9), the noise peak average value AVEN which has been calculated on the basis of the maximum noise level MN is nearly equal to the background level BGLA.

Figure 7:
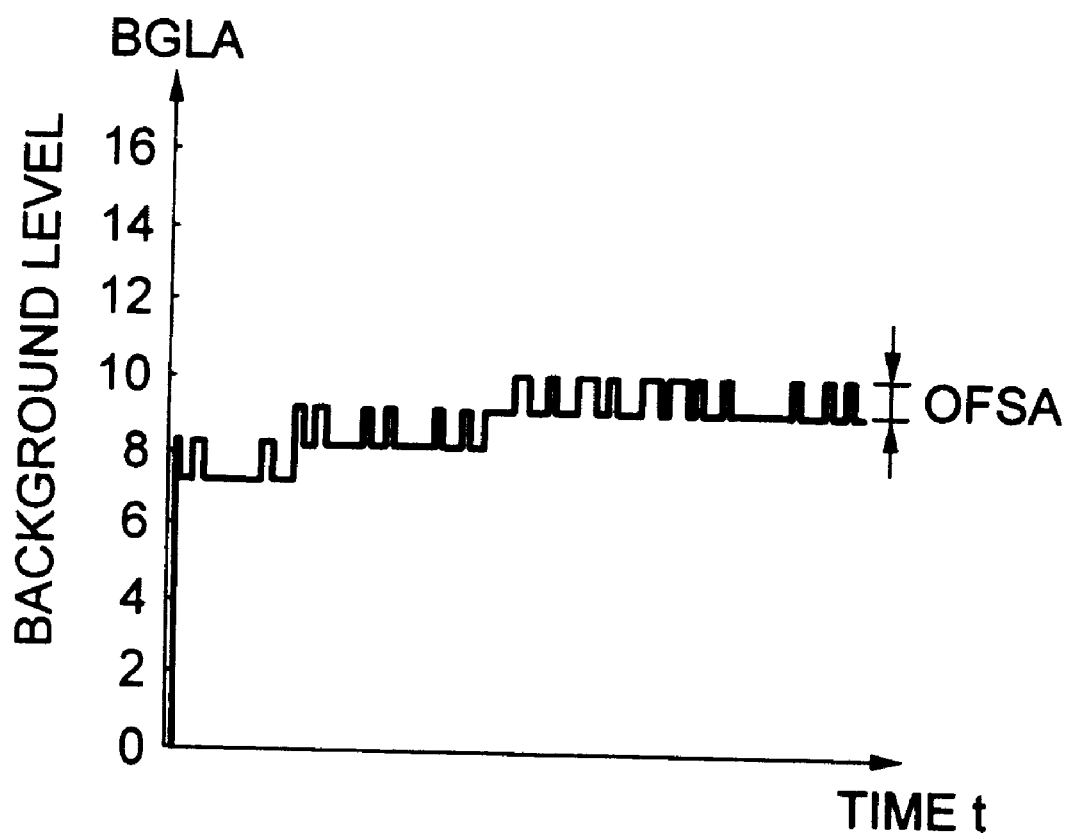
FIG. 7 is an explanatory diagram showing a change in a background level BGLA calculated in accordance with the first embodiment of the present invention with time.

Accordingly, the offset value OFSA allows only a slight correction value as shown in FIG. 7, and is only added in the case where the first state value DE increases.

Only in the case where the first state value DE increases, the offset value OFSA corrects the background level BGLA with an increase. As a result, the number of pulses Pn of the noise level can be prevented from being misjudged as the occurrence of knock.

Finally, the background level BGLA which has been calculated from the expression (9) is stored as a knock judgement value to be used in a succeeding step S3A (step S8), and the processing routine shown in FIG. 2 is completed.

Then, a description will be given of the processing operation of the lower limit value calculating means 24 and the hysteresis integer converting means within the peak value averaging means 26 with reference to an explanatory diagram of FIG. 8.

Figure 8:
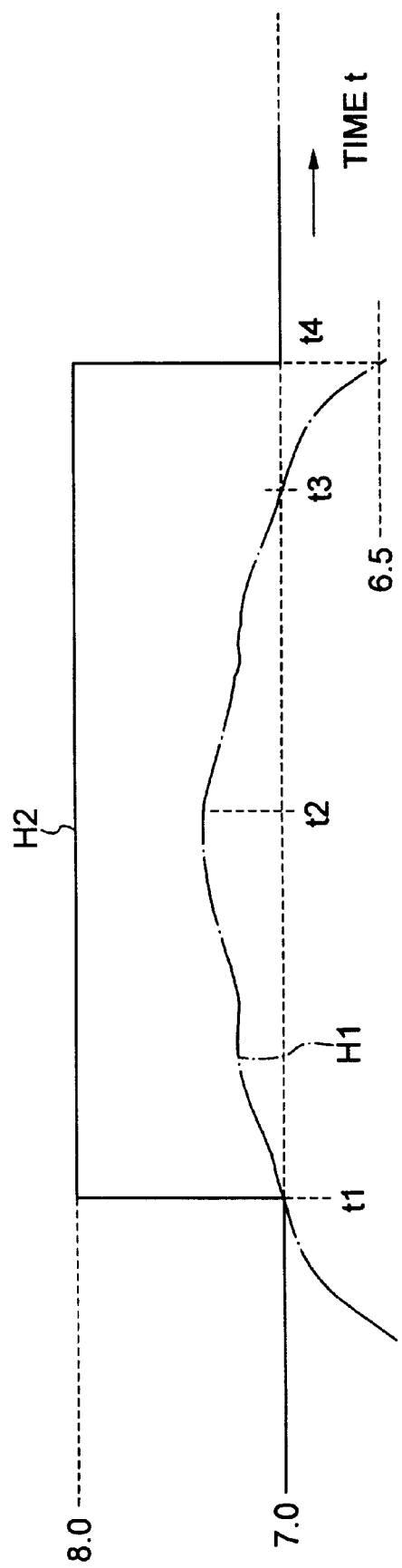
FIG. 8 is an explanatory diagram showing the hysteresis converting operation (hysteresis integer conversion) in accordance with the first embodiment of the present invention.

Referring to FIG. 8, a change in an object value H1 to be converted into a hysteresis integer with time is indicated by an alternate long and short dash line, and a change in an integer value H2 which has been converted into a hysteresis integer with time is indicated by a solid line.

This example shows a case in which the integer value H2 is changed to "7.0" or "8.0".

First, in the case where the object value tends to increase in an initial stage of FIG. 8, the hysteresis integer converting means adds a given correction value "0.5" to the object value H1 and thereafter rounds one place of decimals of the object value H1 to convert the object value H1 into an integer.

Accordingly, at a time t1, if the object value H1 reaches "7.0", the integer value H2 increases from "7.0" to "8.0".

Then, during a period t1 to t3 indicating that the object value H1 is within a range of from 7.0 to 8.0, the integer value H2 is held at "8.0".

On the other hand, at a time t2, in the case where the object value H1 tends to decrease, the hysteresis integer converting means decreases the integer value H2 to "7.0" at the time when a value resulting from adding "1" to the object value H1 and rounding one place of decimals of the object value H1 becomes smaller than the integer value H2 (=8.0).

In other words, as shown in FIG. 8, not at the time t3 where the object value H1 decreases to "7.0" or less, but at the time t4 where the object value H1 decreases to "6.5" or less, the integer value H2 becomes "7.0". Accordingly, if the object value H1 is in a range of 5.5<H1<6.5, the integer value H2 becomes "7.0".

As a result, the integer value H2 of the object value H1 is promoted to tend to increase by addition of the given correction value "10.51" if the object value H1 tends to increase, and is suppressed to tend to decrease by setting the rounded value of the object value H1 to a value "7.0" lower by one level at the time of reaching a value "6.0", lower than the newest value "8.0" by two levels if the object value H1 tends to decrease.

Subsequently, the knock detecting operation in accordance with the first embodiment of the present invention will be described with reference to explanatory diagrams of FIGS. 9 and 10.

Figure 9:
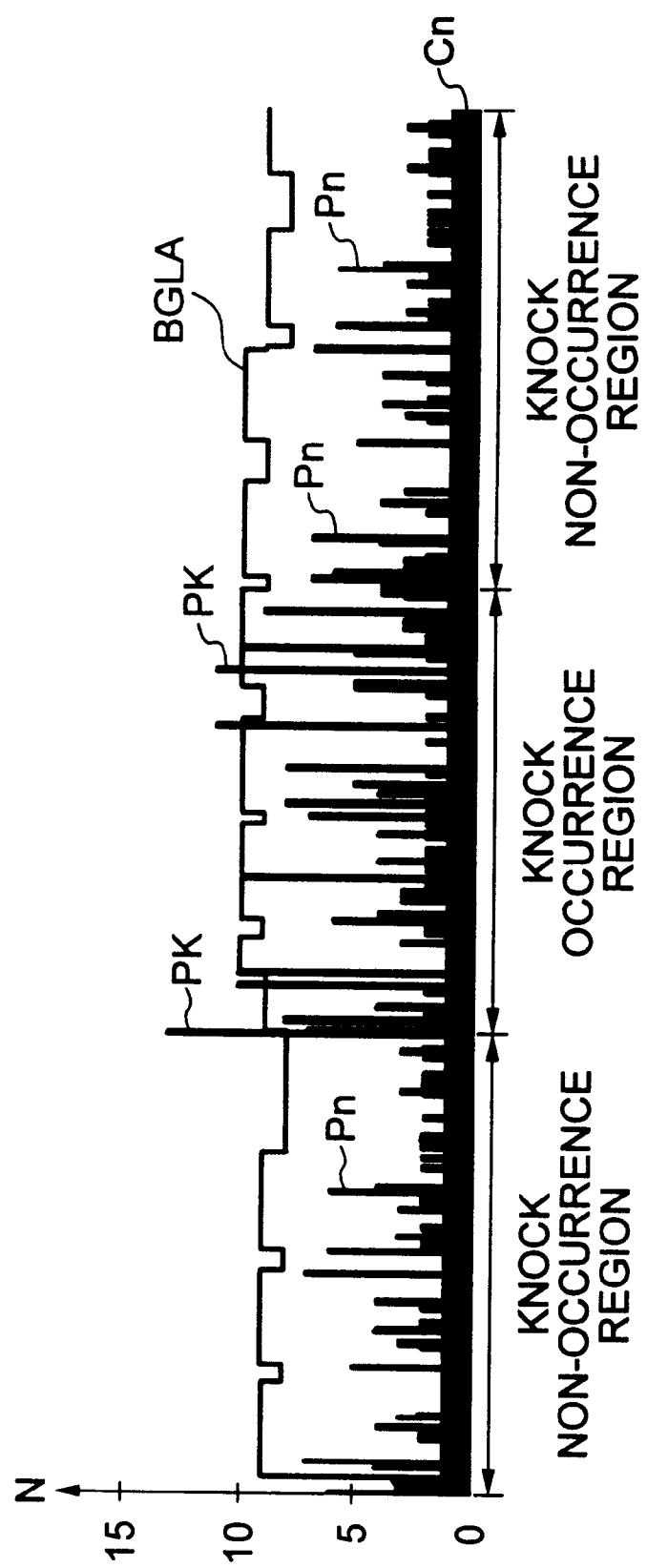
FIG. 9 is an explanatory diagram showing knock detecting operation with a high level signal in accordance with the first embodiment of the present invention.
Figure 10:
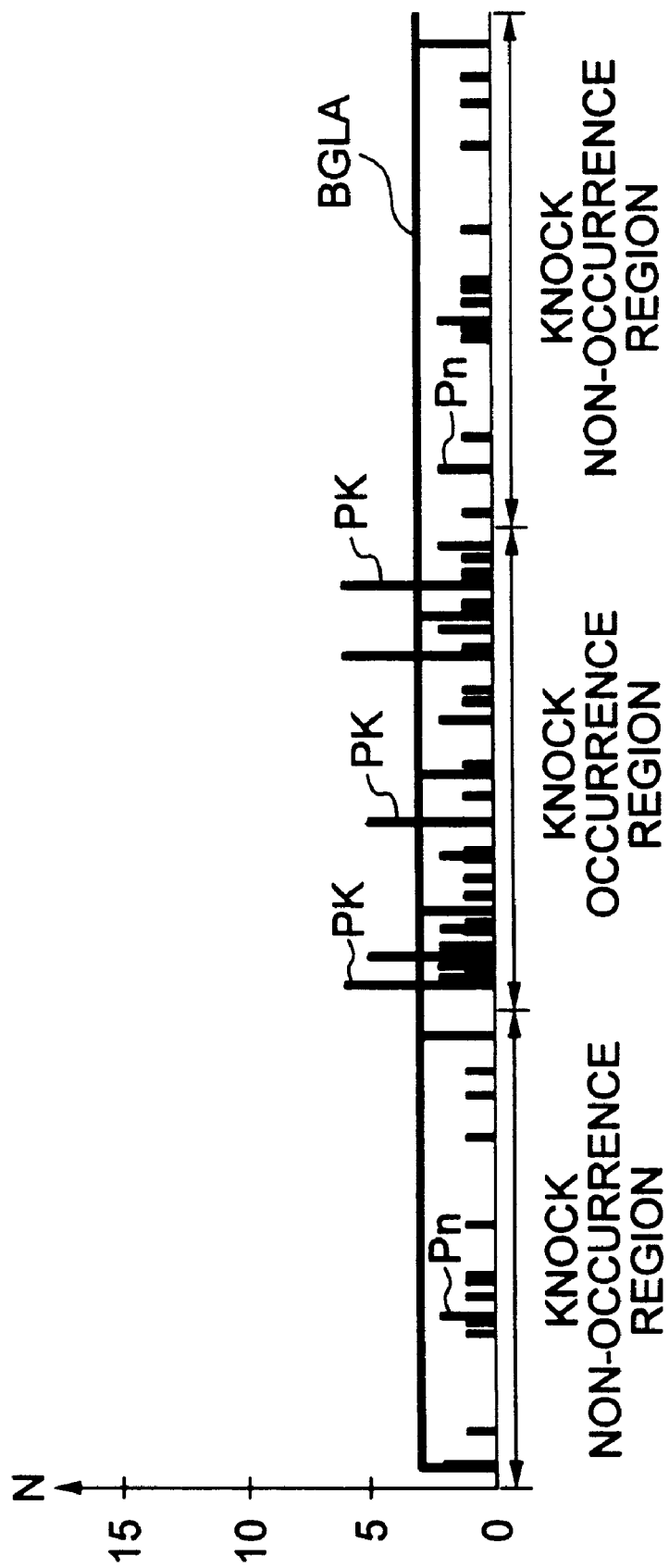
FIG. 10 is an explanatory diagram showing knock detecting operation with a low level signal in accordance with the first embodiment of the present invention.
Figure 16:
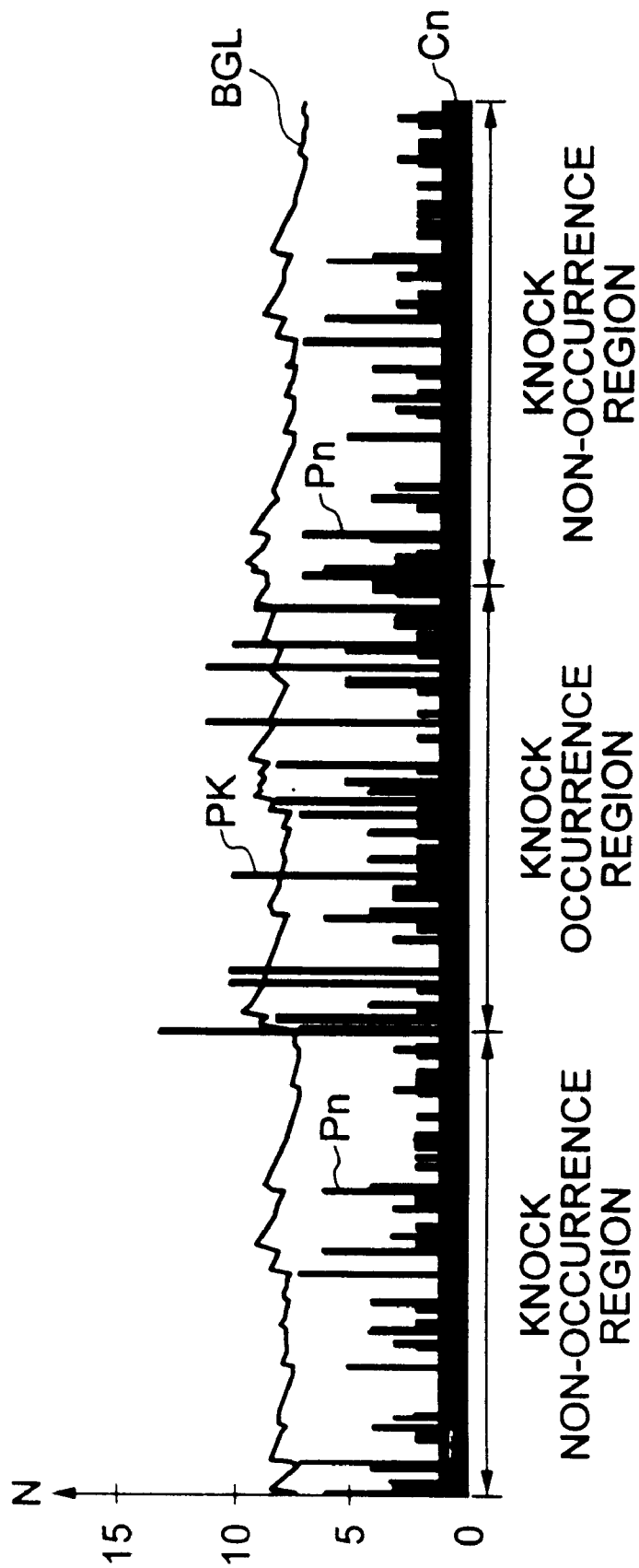
FIG. 16 is an explanatory diagram showing knock detecting operation at a high level in the conventional knock control device for a n internal combustion engine.
Figure 17:
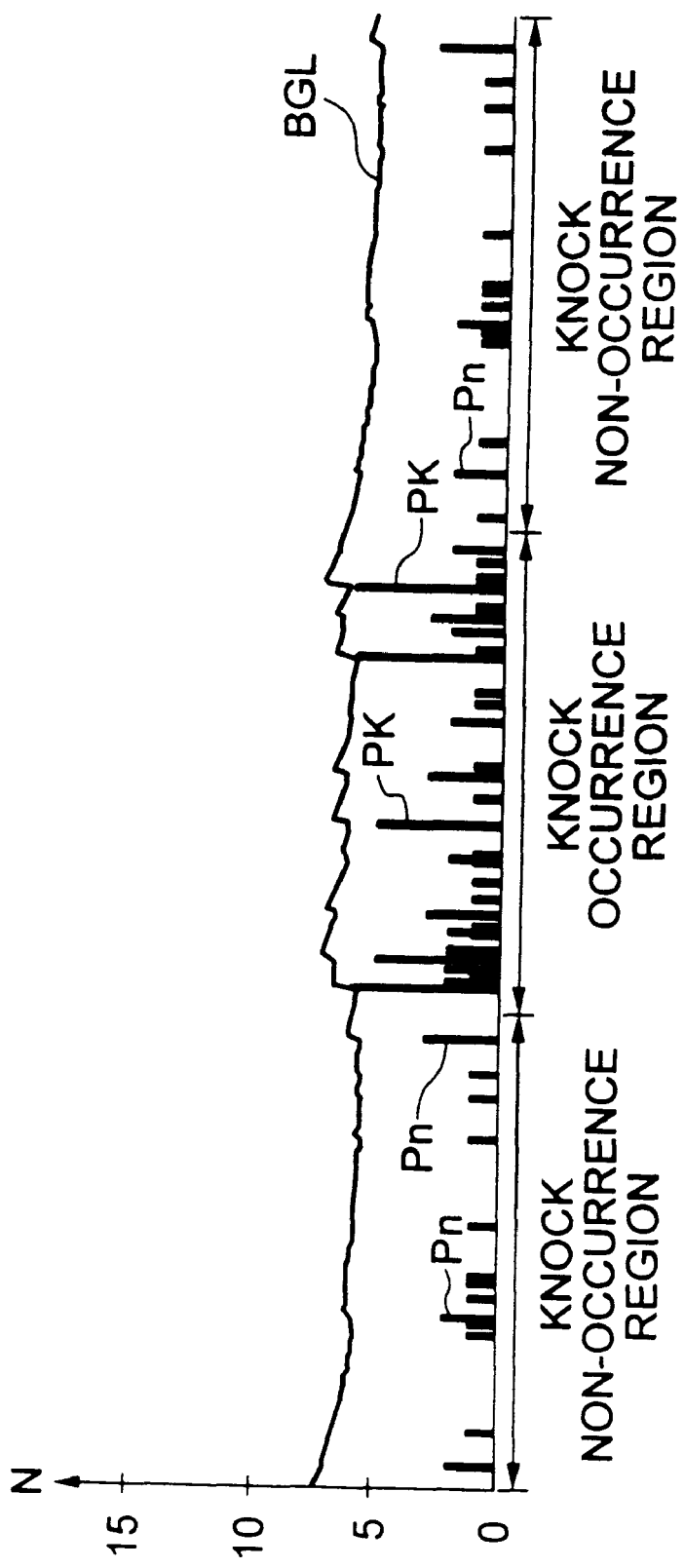
FIG. 17 is an explanatory diagram showing knock detecting operation at a low level in the conventional knock control device for an internal combustion engine.

FIGS. 9 and 10 correspond to FIGS. 16 and 17 described above, and parts identical with those described above are designated by the same reference and their detailed description will be omitted.

In this case, since the background level BGLA is calculated from the noise peak average value AVEN taking the data variation of the number of pulses N into consideration, the noise level of the number of pulses N is always accurately reflected.

Accordingly, even if the noise level is totally high as shown in FIG. 9, or even if the noise level is totally low as shown in FIG. 10, the noise and knock occurrence states can be accurately judged.

For example, in FIG. 9, the relatively high background level BGLA is set on the basis of the noise peak average value AVEN, and more particularly in the knock occurrence region, the background level BGLA higher than that of the knock non-occurrence region is set.

Accordingly, the number of pulses Pn of the noise level is not misjudged as the knock occurrence in the knock non-occurrence region, and the number of pulses Pk of the knock occurrence level is not misjudged as the noise in the knock occurrence region.

On the other hand, in FIG. 10, the relatively low background level BGLA is set on the basis of the noise peak average value AVEN.

Also, in this case, since the data variation of the number of pulses N is small, and the offset value OFSA is "0", the background level BGLA is substantially stably fixed so as to coincide with the noise peak average value AVEN (the minimum value of the knock judgment level).

Accordingly, the knock occurrence can be surely judged with respect to the number of pulses N which is low in level in the knock occurrence region so that the number of pulses Pk of the knock occurrence level is not misjudged as the noise.

In this way, since the background level BGLA is made appropriate, the knock judgment is normally conducted due to N>BGLA if the number of pulses Pk corresponding to the knock occurrence level is detected, and also the noise judgment is normally conducted due to N BGLA if the number of pulses Pn corresponding to the noise level is detected.

Accordingly, even if the data variation state of the number of pulses N fluctuates, the reliability of knock detection can be maintained on the basis of an appropriate knock judgement, thereby being capable of improving the spark delay control state of the ignition timing at the time of knock occurrence.

Also, in a transient state, if the r.p.m. of the engine or the load is rapidly changed, the background level BGLA can be immediately optimized referring to the map data of the correction coefficient corresponding to the rapid change.

The two-dimensional map data of the correction coefficient to the r.p.m. of the engine and the load consists, for example, an index value matrix corresponding to the respective running states, and is referred to only at the time of rapidly changing the running state. The respective index values are set to become larger as the r.p.m. of the engine is high, and larger as the load is low.

When the running state is rapidly changed, the index value L(n−1) in the running state immediately before it is rapidly changed and the index value L in the present running state are referred to, and the background level BGLA is corrected as represented by the following expression (10).

$$BGLA = \{L/L(n-1) \times BGLA(n-1)\} \tag{10}$$

In the expression (10), BGLA(n−1) is the previous background level.

For example, in the case where it is detected that the r.p.m. of the engine is rapidly increased, the correction coefficient which is so set as to increase in response to the degree of increase is multiplied by the previous background level BGLA(n−1) so that the present background level BGLA is corrected to increase.

Alternatively, when the running state is rapidly changed, the index value is referred to in the same manner, and the filter coefficient Kf for filtering within the background level calculating means is corrected to increase, thereby improving the follow-up property of the background level BGLA.

Also, in this example, the given period is set by the number of ignition cycles of the engine. Alternatively, a time corresponding to the r.p.m. of the engine may be set as the map value.

Further, the number of pulses N of the knock signal Ki is used as the knock level signal, but it is needless to say that an arbitrary parameter such as the peak value or the integral value of the knock signal Ki may be used as the knock level signal as is well known.

(Second Embodiment)

It is noted that, in the above-described first embodiment, the noise state or knock occurrence is simply judged on the basis of the comparison result of the number of pulses N with the background level BGLA. Alternatively, an intermediate judgement region may be set using the noise peak average value AVEN (or the noise peak value PA).

In this case, the comparing means 15 judges that the number of pulses N represents the noise if the number of pulses N is equal to or less than the noise peak average value AVEN (noise peak value PA), and employs the previous judgement result as the present judgement result if the number of pulses N exceeds the noise peak average value AVEN and is also equal to or less than the background level BGLA.

In other words, in the case where the previous judgement result is "knock occurrence", even if the detected data of the present number of pulses N is equal to or less than the background level BGLA (=AVEN+OFSA), if the detected data exceeds the noise peak average value AVEN, it is judged as "knock occurrence" in order to execute the control at the safe side.

Also, the comparing means 15 judges that the number of pulses N represents the noise level regardless of the previous judgement result if a state in which the number of pulses N exceeds the noise peak average value AVEN and is equal to or less than the background level BGLA continues over the given ignition cycle (given period).

Hereinafter, a description will be given of the operation of setting the intermediate judgement region using the noise peak average value AVEN (or noise peak value PA) according to a second embodiment of the present invention with reference to FIG. 11.

Figure 11:
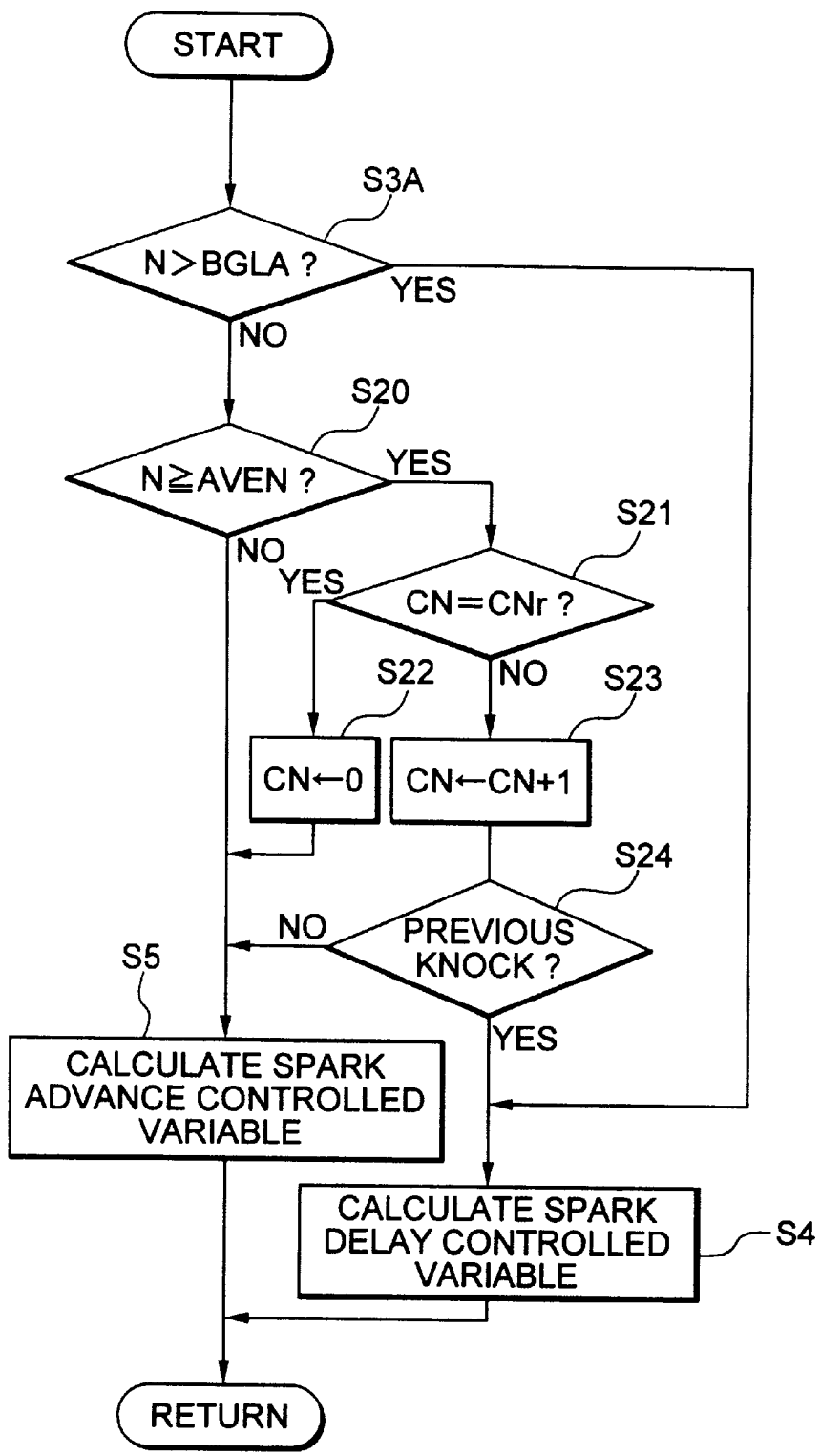
FIG. 11 is a flowchart showing the processing operation of knock judging means and controlled variable operating means in accordance with a second embodiment of the present invention.
Figure 12:
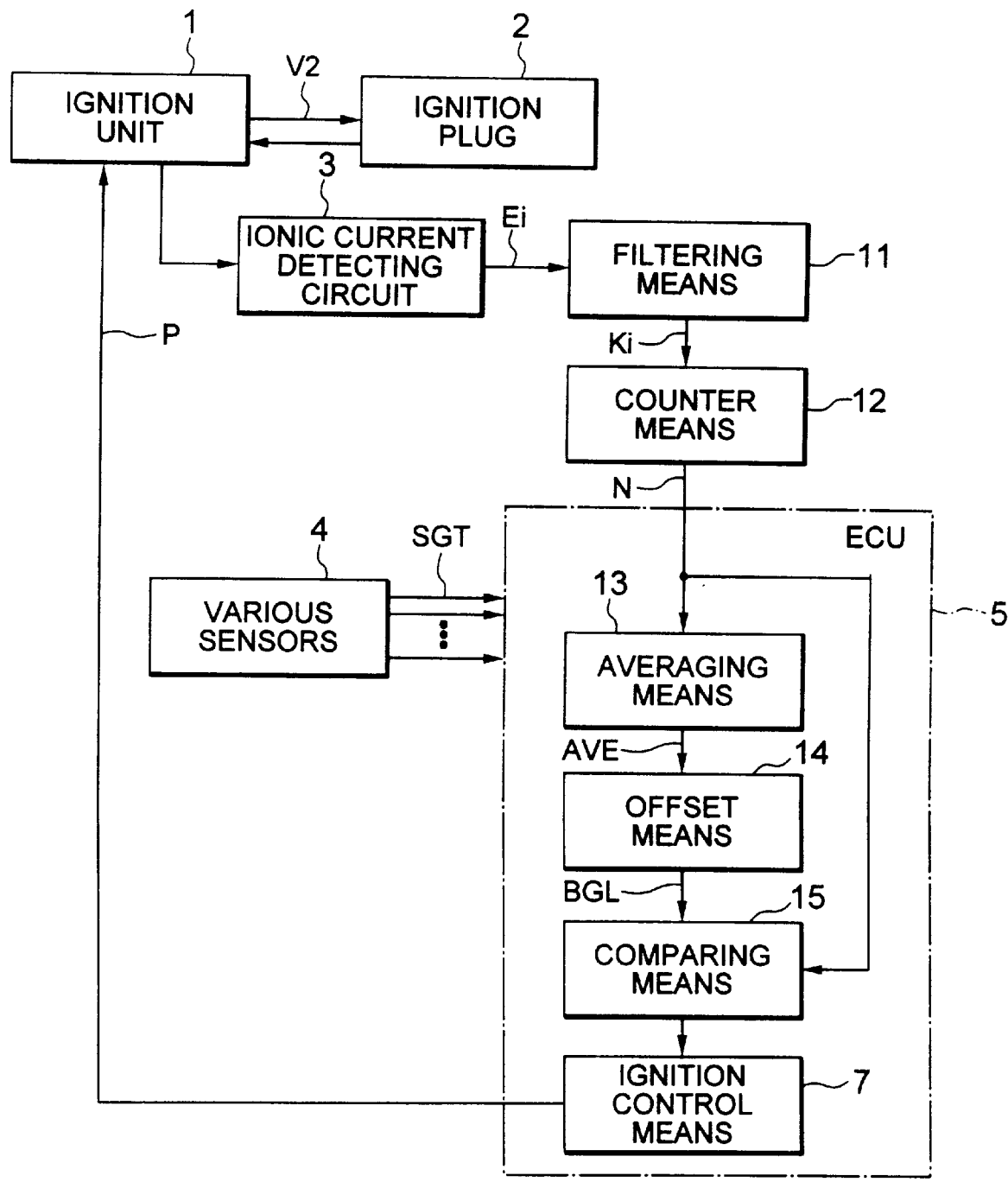
FIG. 12 is a block diagram showing a conventional knock control device for an internal combustion engine.
Figure 13:
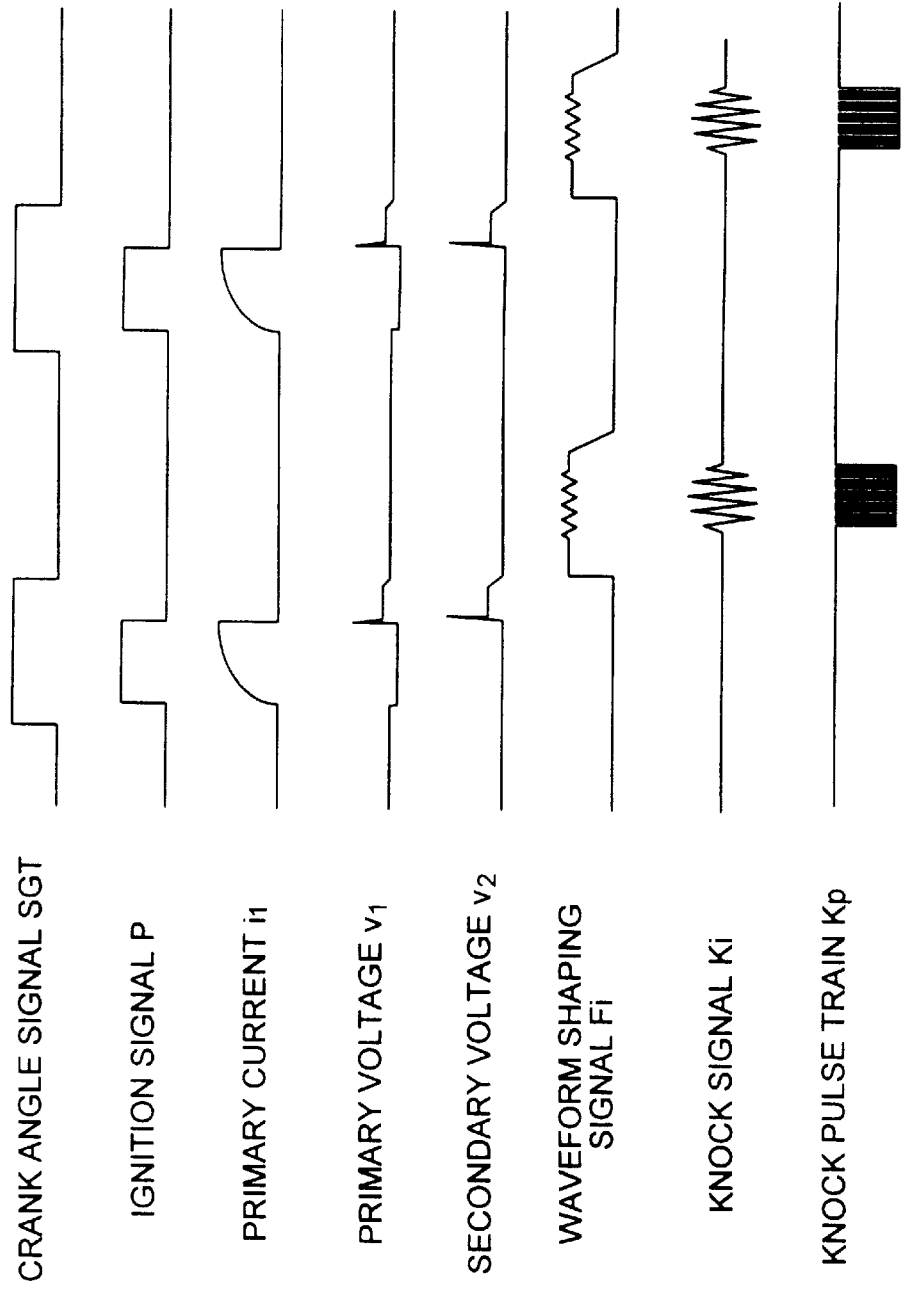
FIG. 13 is a waveform diagram showing the operation of the conventional knock control device for an internal combustion engine.

FIG. 11 is a flowchart showing the processing operation of the comparing means 15 and the ignition control means 7 in accordance with the second embodiment of the present invention, in which the respective steps S3A, S4 and S5 are the same processing operation as that described above (refer to FIG. 2).

In this case, the comparing means 15 includes a timer counter CN for measuring the lapse of a given period. The timer counter CN is initially set to CN=0 and stores a given counter value CNr corresponding to the given period therein in advance.

First, if it is judged in step S3A as N>BGLA (that is, YES), since the number of pulses N is surely the knock level, the operation proceeds to the calculation processing of the above-described spark delay controlled variable (step S4).

On the other hand, if it is judged in step S3A as N BGLA (that is, NO), it is then judged whether the number of pulses N is equal to or more than the noise peak average value AVEN (within the intermediate judgement region), or not (step S20).

If it is judged in step S20 as N<AVEN (that is, NO), since the number of pulses N surely represents the noise level, the operation proceeds to the calculation processing of the above-described spark advance controlled variable (step S5).

On the other hand, if it is judged in step S20 as N AVEN (that is, YES), it is then judged whether the timer counter CN reaches a given counter value CNr (a given period elapses), or not (step S21).

If it is judged in step S21 as CN=CNr (that is, YES), since the number of pulses N within the intermediate judgement region is continuously detected over the given period, the present number of pulses N is regarded as the noise level regardless of the previous judgement result.

Accordingly, the timer counter CN is cleared to 0 (step S22), and the operation proceeds to the step S5.

On the other hand, if it is judged in step S21 as CN<CNr (that is, NO), since the given period does not elapse after the number of pulses N within the intermediate judgement region is detected, the timer counter CN is incremented (step S23), and it is then judged whether the previous judgement result represents the knock, or not (step S24).

If it is judged in step S24 that the previous judgement result does not represent the knock (that is, NO), the number of pulses N is regarded as the noise level as in the previous judgement result, and the operation proceeds to the step S5.

On the other hand, if it is judged in step S24 that the previous judgement result represents the knock (that is, YES), the number of pulses N is regarded as the knock occurrence as in the previous judgement result, and the operation proceeds to the step S4.

In this way, in the case where the number of pulses N of the knock level is shifted to the intermediate judgement region, the previous judgement result (knock occurrence) is regarded as the present judgement result so that the knock judgement can be made even if the data level of the number of pulses N is rapidly decreased, thereby being capable of obtaining the judgement result high in reliability even if the data variation is large.

Also, in the case where the number of pulses N within the intermediate judgement region is continuously detected over the given period, it is presumed that the background level BGLA can sufficiently follow up the variation (rapid decrease) of the number of pulses N, and the number of pulses N is judged as the noise level with priority to the judgement result of the background level BGLA or less regardless of the previous judgement result.

As a result, in the case where the number of pulses N is stabilized after fluctuation, the judgement result high in reliability can be obtained on the basis of the normal background level BGLA.

(Third Embodiment)

It is noted that the processing of operating the controlled variable when the knock occurs is not particularly described in the above-described first embodiment, however, for example, the ignition timing spark delay amount due to the ignition signal P may be arithmetically operated on the basis of a comparison value representative of the ratio or the deviation of the number of pulses N and the background level BGLA.

In this way, if the controlled variable is corrected by using the comparison value corresponding to the frequency of knock occurrences, the ignition timing is not corrected in spark delay gradually given amount by given amount, but the ignition timing can be quickly optimized in response to the number of pulses N when the knock occurs.

In particular, in the present invention where the background level BGLA can be calculated by quickly following up the data variation or the level fluctuation of the number of pulses N, a greater effect can be obtained by quickly optimizing the ignition timing.

The controlled variable X is fundamentally arithmetically operated from the ratio of the number of pulses N and the background level BGLA, and is obtained from the following expression (11) using the given coefficient k9 (>1) for multiplication correction.

$$X=(N/BGLA) \times k9 \qquad (11)$$

However, if the ratio (=N/BGLA) is smaller than the given value and nearly equal to "1", since the sufficient controlled variable X is not obtained even if the given coefficient k9 is multiplied by the ratio, the deviation of the number of pulses N and the background level BGLA is used as the comparison value for controlled variable operation.

In this case, the controlled variable X is obtained from the following expression (12) using the given coefficient k10 (>1) for multiplication correction.

$$X=(N-BGLA) \times k10 \qquad (12)$$

In this way, since the given coefficient k10 is multiplied by the deviation (=N−BGLA), even if the absolute value of the deviation is small, the sufficiently large controlled variable X can be calculated.

(Fourth Embodiment)

It is noted that, in the above-described third embodiment, the controlled variable X is calculated by using the comparison value of the number of pulses N and the background level BGLA. Alternatively, the absolute value of the number of pulsed N when the knock occurrence is judged, or the level deviation of the number of pulses N and the knock level average value AVE may be used.

In this case, the ignition control means 7 (refer to FIG. 1) includes a comparing means for comparing the knock level average value AVE from the averaging means 13 with a given level, and a subtracting means for calculating the level deviation (=N−AVE) of the number of pulses N and the knock level average value AVE.

With this structure, the ignition control means 7 arithmetically operates the controlled variable X on the basis of the absolute value of the number of pulses N if the knock level average value AVE is equal to or less than the given level, and arithmetically operates the controlled variable X on the basis of the level deviation if the knock level average value AVE exceeds the given level.

That is, the ignition control means 7 calculates the absolute value of the number of pulses N which is not subtracted (sufficiently large) as the controlled variable X if the steady noise level in the number of pulses N decreases, and a value resulting from subtracting the knock level average value AVE from the number of pulses N as the controlled variable X in order to suppress an increase in the unnecessary controlled variable X due to the increase in the steady noise level if the steady noise level in the number of pulses N increases.

As a result, even when the level of the number of pulses N is lowered, the reflectance of the controlled variable X to the knock intensity when the knock occurs is further improved, thereby being capable of optimizing the controlled variable X immediately.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A knock control device for an internal combustion engine, comprising:
   various sensors for detecting the running state of the internal combustion engine;
   ionic current detecting means for detecting an ionic current that flows through an ignition plug by combustion of fuel;
   knock level calculating means for calculating a knock level signal corresponding to a knock state of the internal combustion engine on the basis of the ionic current;
   background level calculating means for calculating a background level on the basis of the knock level signal;
   knock judging means for judging the knock state of the internal combustion engine by comparing the knock level signal with the background level; and
   controlled variable operating means for arithmetically operating the controlled variable of the internal combustion engine on the basis of the running state of the internal combustion engine and a judgement result of the knock judging means;
   wherein said background level calculating means includes maximum noise level estimating means for arithmetically estimating a maximum noise level on the basis of a variation in the knock level signal, and peak hold means for obtaining a noise peak value on the basis of the maximum noise level, and calculates the background level on the basis of the noise peak value.

2. The knock control device for an internal combustion engine as claimed in claim 1, wherein said peak hold means includes lower limit value calculating means for calculating a lower limit value of the maximum noise level as a relative reference; and
   wherein said peak hold means updates the maximum noise level as the noise peak value if the maximum noise level exceeds the lower limit value, holds the noise peak value over a given period if the maximum noise level is equal to or less than the lower limit value, and subtracts only a given value from the noise peak value and updates the noise peak value until the maximum noise level reaches the lower limit value if a state in which the maximum noise level is equal to or less than the lower limit value continues for the given period or longer.

3. The knock control device for an internal combustion engine as claimed in claim 2, wherein said lower limit value calculating means includes hysteresis converting means, calculates the maximum noise level average value by averaging the maximum noise level and outputs a value resulting from converting the maximum noise level average value into hysteresis as the lower limit value.

4. The knock control device for an internal combustion engine as claimed in claim 1, wherein said maximum noise level estimating means includes data shift means for storing a given number of newest knock level signals therein, first operating means for calculating a first state value corresponding to a data variation of the knock level signals using the given number of knock level signals, and second operating means for arithmetically estimating the maximum noise level on the basis of the first state value.

5. The knock control device for an internal combustion engine as claimed in claim 4, wherein said data shift means includes arithmetically substituting means for substituting a value equal to or less than the noise peak value for the knock level signal that exceeds the background level and storing the substituted value therein.

6. The knock control device for an internal combustion engine as claimed in claim 4, wherein said first operating means approximately operates a sample standard deviation of the given number of knock level signals as the first state value.

7. The knock control device for an internal combustion engine as claimed in claim 6, wherein said first operating means approximately operates the sample standard deviation by using an addition value of the maximum value and the minimum value of the given number of knock level signals.

8. The knock control device for an internal combustion engine as claimed in claim 4, wherein said second operating means calculates the second state value corresponding to a level of the knock level signal and arithmetically estimates the maximum noise level by using an addition value of the first state value and the second state value.

9. The knock control device for an internal combustion engine as claimed in claim 8, wherein said maximum noise level estimating means includes averaging means for averaging the knock level signal to calculate the knock level average value, and said second operating means calculates the second state value by using the knock level average value.

10. The knock control device for an internal combustion engine as claimed in claim 1, wherein said background level calculating means includes offset calculating means for calculating the offset value on the basis of a variation in the knock level signal and offset means for calculating the background level by adding the noise peak value and the offset value, and said offset calculating means sets the offset value to an increased value in response to an increase of the first state value.

11. The knock control device for an internal combustion engine as claimed in claim 10, wherein said knock judging means judges that the internal combustion engine is in a knock state if the knock level signal exceeds the background level, judges that the knock level signal represents a noise if the knock level signal is equal to or less than the noise peak value, and uses a previous judgement result as a present judgement result if the knock level signal exceeds the noise peak value and is equal to or less than the background level.

12. The knock control device for an internal combustion engine as claimed in claim 11, wherein said knock judging means judges that the knock level signal represents a noise if a state where the knock level signal exceeds the noise peak value and is equal to or less than the background level continues over a given period.

13. The knock control device for an internal combustion engine as claimed in claim 1, wherein said background level calculating means includes peak value averaging means for averaging the noise peak value to calculate the noise peak average value, and calculates the background level on the basis of the noise peak average value, and said peak value averaging means includes hysteresis converting means and calculates the noise peak average value as a hysteresis value.

14. The knock control device for an internal combustion engine as claimed in claim 13, wherein said hysteresis converting means adds a given correction value to the noise peak average value if the noise peak average value tends to go up, and subtracts only one level from the noise peak average value at the time when the noise peak average value goes down to a lower value by only two levels if the noise peak average value tends to go down, to thereby calculate the noise peak average value as a hysteresis value.

15. The knock control device for an internal combustion engine as claimed in claim 1, wherein said background level calculating means includes map data for storing a correction coefficient corresponding to a rapid change in the engine revolution and a load, and variously sets the background level on the basis of the map data over the given period if the engine revolution or the load is rapidly changed.

16. The knock control device for an internal combustion engine as claimed in claim 1, wherein said controlled variable operating means arithmetically operates the controlled variable of the internal combustion engine on the basis of a comparison value representative of a ratio or a deviation of the knock level signal and the background level.

17. The knock control device for an internal combustion engine as claimed in claim 16, wherein said controlled variable operating means arithmetically operates, if the ratio of the knock level signal and the background level is equal to or more than a given value, the controlled variable by using the ratio, and arithmetically operates the controlled variable by using the level deviation of the knock level signal and the background level if the ratio is smaller than the given value.

18. The knock control device for an internal combustion engine as claimed in claim 1, wherein said controlled variable operating means includes averaging means for averaging the knock level signal to calculate the knock level average value, comparing means for comparing the knock level average value with a given level, and subtracting means for calculating a level deviation of the knock level signal and the knock level average value, and arithmetically operates the controlled variable of the internal combustion engine on the basis of an absolute value of the knock level signal if the knock level average value is equal to or less than the given level and arithmetically operates the controlled variable of the internal combustion engine on the basis of the level deviation if the knock level average value exceeds the given level.

* * * * *